US008980163B2

(12) United States Patent
Horikoshi et al.

(10) Patent No.: US 8,980,163 B2
(45) Date of Patent: Mar. 17, 2015

(54) PROCESS FOR PRODUCING PLASTIC BOTTLE

(75) Inventors: Takahiro Horikoshi, Saitama (JP); Tsuyoshi Urushihara, Saitama (JP); Yota Tsuneizumi, Saitama (JP)

(73) Assignee: Adeka Corporation, Tokyo (JP)

( * ) Notice: Subject to any disclaimer, the term of this patent is extended or adjusted under 35 U.S.C. 154(b) by 306 days.

(21) Appl. No.: 13/259,171

(22) PCT Filed: Mar. 26, 2010

(86) PCT No.: PCT/JP2010/055366
§ 371 (c)(1),
(2), (4) Date: Sep. 23, 2011

(87) PCT Pub. No.: WO2010/110422
PCT Pub. Date: Sep. 30, 2010

(65) Prior Publication Data
US 2012/0013049 A1  Jan. 19, 2012

(30) Foreign Application Priority Data

Mar. 27, 2009  (JP) ................................. 2009-078851

(51) Int. Cl.
B29C 49/06 (2006.01)
B29C 45/00 (2006.01)
C08J 3/22 (2006.01)
C08K 5/47 (2006.01)

(52) U.S. Cl.
CPC ................. B29C 45/00 (2013.01); C08J 3/226 (2013.01); C08K 5/47 (2013.01); C08J 2367/02 (2013.01); C08J 2467/00 (2013.01)
USPC .......................................... 264/537; 264/523

(58) Field of Classification Search
None
See application file for complete search history.

(56) References Cited

U.S. PATENT DOCUMENTS

| 4,135,028 | A | 1/1979 | Hiestand et al. |
| 4,393,178 | A | 7/1983 | Legras et al. |
| 5,684,062 | A | 11/1997 | Ebert et al. |
| 6,166,116 | A | 12/2000 | Sleeckx |
| 2007/0066792 | A1* | 3/2007 | Colhoun et al. ............. 528/272 |

FOREIGN PATENT DOCUMENTS

| EP | 0 534 569 A1 | 3/1993 |
| EP | 0742260 A1 | 11/1996 |
| EP | 2 022 826 A1 | 2/2009 |
| EP | 2 077 298 A1 | 7/2009 |
| JP | 58-079034 | 5/1983 |
| JP | 07-179617 | 7/1995 |
| JP | 8-156077 A | 6/1996 |
| JP | 2003-183485 A | 7/2003 |
| JP | 2004-263195 A | 9/2004 |
| JP | 2007-327028 A | 12/2007 |
| JP | 2009-52044 A | 3/2009 |
| WO | WO 99/23148 | 5/1999 |
| WO | 2007/129527 A1 | 11/2007 |
| WO | WO 2008/038465 A1 | 4/2008 |

OTHER PUBLICATIONS

International Search Report, dated Jun. 15, 2010 in PCT/JP2010/055366.
Chinese Office Action for corresponding Application No. 201080014133.4 dated Nov. 22, 2012 (with partial English translation).
Zhang, "Extrusion Molding", Chemical Industry Press, Jul. 31, 2002, pp. 270-272 (8 pages provided with English translation).
European Search Report issued in European patent application No. 10756218.3 on Feb. 8, 2013.

* cited by examiner

*Primary Examiner* — Monica Huson
(74) *Attorney, Agent, or Firm* — Birch, Stewart, Kolasch & Birch, LLP

(57) ABSTRACT

Provided in a method of producing a plastic bottle in which molding cycle is improved and a highly transparent plastic bottle rarely having a problem of discoloration such as whitening is produced. The method according to the present invention is a method of producing a plastic bottle comprising 0.005 to 0.025 parts by mass of a 1,2-benzisothiazol-3(2H)-one 1,1-dioxide compound with respect to 100 parts by mass of a polyester resin, the method comprising preparing a masterbatch containing 0.01 to 0.5 parts by mass of the above-described 1,2-benzisothiazol-3(2H)-one 1,1-dioxide compound with respect to 100 parts by mass of the polyester resin, subsequently mixing the masterbatch and polyester resin to produce a mixture, and molding the mixture into the shape of a bottle. Further, it is preferred that the above-described polyester resin be a polyethylene terephthalate resin.

10 Claims, No Drawings

PROCESS FOR PRODUCING PLASTIC BOTTLE

TECHNICAL FIELD

The present invention relates to a method of producing a plastic bottle. More particularly, the present invention relates to a method of producing a plastic bottle which comprises preparing a masterbatch containing a polyester resin and 1,2-benzisothiazol-3(2H)-one 1,1-dioxide compound; mixing the master batch with a polyester resin; and molding the resulting mixture.

Polyester resins have a number of characteristics including excellent transparency, gas barrier properties, mechanical properties, heat resistance and lightweight property. In particular, use of polyethylene terephthalate resins has rapidly grown in association with the increasing demands in the field of various soft drinks such as carbonated waters and mineral waters, and polyethylene terephthalate resins are now applied in a wide variety of fields.

Examples of a method of producing a plastic bottle using a polyethylene terephthalate resin include the method disclosed in Patent Document 1. In this method, a polyethylene terephthalate resin is ejected (extruded) to prepare a preform (pre-molded article), which is then injection (extrusion) molded, and the mouth part of the thus molded test tube-shaped preform is heated to be crystallized. The preform is then placed in a blow die of a blow molding machine and supported at the mouth part. The preform is blow molded by blowing a gas thereto into a prescribed plastic bottle, which is then allowed to cool and released from the die to obtain a plastic bottle.

However, despite the fact that polyethylene terephthalate is a crystalline resin, its crystallization rate is extremely slow and, therefore, the range of the molding conditions is extremely limited, so that there is a problem that the molding cycle of plastic bottles is long.

As a method of improving the crystallization rate, there is generally known a method of adding a nucleating agent. Examples of the nucleating agent include polymers, minerals, metal salts of organic acids and inorganic acids, powder glass and powder metals. More specific examples thereof include olefins such as low-density polyethylene, high-density polyethylene and linear low-density polyethylene; minerals (clays) such as graphite, talc and kaolin; metal oxides such as zinc oxide, alumina and magnesium oxide; silica compounds such as silica, calcium silicate and magnesium silicate; metal carbonates such as magnesium carbonate, calcium carbonate, sodium carbonate and potassium carbonate; barium sulfate; calcium sulfate; sodium benzoate; aluminum p-tert-butyl benzoate; metal salts of aromatic phosphate; dibenzylidene sorbitols; and sulfonamide compounds. In addition, for example, Patent Document 2 proposes a polyester resin composition produced by adding a metal salt of a sulfonamide compound in a powder-form to a polyethylene terephthalate resin.

RELATED ART DOCUMENTS

Patent Documents

Patent Document 1: Japanese Unexamined Patent Application Publication No. H08-156077
Patent Document 2: Japanese Unexamined Patent Application Publication No. 2007-327028

SUMMARY OF THE INVENTION

Problems to be Solved by the Invention

However, in cases where powder 1,2-benzisothiazol-3(2H)-one 1,1-dioxide sodium salt is added to a polyethylene terephthalate resin, there are problems, for example, in that, although the crystallization rate is improved by molding a preform, the surface thereof becomes partially whitened and blow molding thereof becomes impossible, so that a plastic bottle cannot be molded.

Therefore, an object of the present invention is to provide a method of producing a highly transparent plastic bottle which rarely has a problem of discoloration such as whitening, by which method the above-described problems of the prior arts are solved and the molding cycle is improved.

Means for Solving the Problems

In order to solve the above-described problems, the present inventors intensively studied to discover that the above-described object can be achieved by adding a 1,2-benzisothiazol-3(2H)-one 1,1-dioxide compound to a polyester resin by a masterbatch method, thereby completing the present invention.

That is, the method of producing a plastic bottle according to the present invention is a method of producing a plastic bottle comprising 0.005 to 0.025 parts by mass of a 1,2-benzisothiazol-3(2H)-one 1,1-dioxide compound with respect to 100 parts by mass of a polyester resin, the method comprising preparing a masterbatch containing 0.01 to 0.5 parts by mass of the above-described 1,2-benzisothiazol-3(2H)-one 1,1-dioxide compound with respect to 100 parts by mass of the polyester resin, subsequently mixing the masterbatch and polyester resin to produce a mixture, and molding the mixture into the shape of a bottle.

Further, in the method of producing a plastic bottle according to the present invention, it is preferred that the above-described 1,2-benzisothiazol-3(2H)-one 1,1-dioxide compound be represented by the following Formula (1):

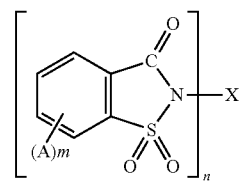

(wherein, A represents a halogen atom, $C_1$-$C_8$ alkyl group which is optionally substituted, $C_1$-$C_8$ alkoxy group which is optionally substituted, $C_1$-$C_5$ alkylthio group, nitro group or cyano group; when there are plural As, they are each optionally different; m represents an integer of 0 to 4; X represents a metal atom; and n represents an integer of 1 to 4 which corresponds to the valency of the metal atom represented by X). In addition, in the above-described Formula (1), it is preferred that X be sodium and n be 1.

Further, in the method of producing a plastic bottle according to the present invention, it is preferred that the mixture of the above-described masterbatch and polyester resin be molded into the shape of a bottle by blow molding.

Further, in the method of producing a plastic bottle according to the present invention, it is preferred that the mixture of the above-described masterbatch and polyester resin be injection molded to prepare a cylindrical preform which is then molded into the shape of a bottle by blow molding.

Further, in the method of producing a plastic bottle according to the present invention, it is preferred that the above-described preform be molded into the shape of a bottle by blow molding after the mouth part thereof is heated to be crystallized.

Further, in the method of producing a plastic bottle according to the present invention, it is preferred that the produced plastic bottle be a heat-resistant plastic bottle.

Effects of the Invention

In the present invention, by mixing a masterbatch comprising a 1,2-benzisothiazol-3(2H)-one 1,1-dioxide compound with a polyester resin and using the resulting mixture in the production of a plastic bottle, the molding cycle can be improved without impairing the transparency of the stretched portion of the plastic bottle and aggravating the yellowness.

MODE FOR CARRYING OUT THE INVENTION

Examples of the polyester resin used in the present invention include aromatic polyesters including polyalkylene terephthalates and polyalkylene naphthalates, such as polyethylene terephthalate, polybutylene terephthalate, polycyclohexanedimethylene terephthalate, polyethylene naphthalate and polybutylene naphthalate; polyetherester resins; degradable aliphatic polyesters such as polyhydroxybutyrate, polycaprolactone, polybutylene succinate, polyethylene succinate, polylactic acid resins, polymalic acid, polyglycolic acid, polydioxanone and poly(2-oxetanone); aromatic polyester/polyether block copolymers; aromatic polyester/polylactone block copolymers; and polyarylates. Thereamong, polyethylene terephthalate and polybutylene terephthalate are preferably used since they have good transparency.

Further, in the present invention, the above-described polyester resins may be used individually or as a blend of a plurality thereof (for example, a blend of polyethylene terephthalate and polybutylene terephthalate), or may also be a polyester resin composed of a copolymer thereof (for example, a polyether copolymer of polybutylene terephthalate with polyester of polytetramethylene glycol).

In the present invention, a preferred polyethylene terephthalate resin can be obtained by allowing terephthalic acid and ethylene glycol to go under an esterification reaction or by carrying out a polycondensation reaction of a product obtained by a transesterification reaction of dimethyl terephthalate and ethylene glycol. The polycondensation reaction is usually carried out under a reduced pressure of 1 hectopascal at a temperature of 265 to 300° C., preferably 270 to 290° C. This step may be either batch-wise or continuous.

Further, in the above-described polycondensation reaction, an acid component and/or glycol component may be added as a copolymerization component in such an amount that does not impair the resin characteristics. Examples of the acid component include isophthalic acid, adipic acid, sebacic acid, glutaric acid, diphenylmethane dicarboxylic acid, dimer acid, 2,6-naphthalene dicarboxylic acid and 4,4'-biphenyl dicarboxylic acid and examples of the glycol component include diethylene glycol, 1,3-propanediol, 1,4-butanediol, hexamethylene glycol, 1,4-cyclohexane dimethanol, bisphenol A and ethylene oxide adduct or neopentyl glycol-alkylene oxide adduct of bisphenol S. Thereamong, it is preferred that isophthalic acid and diethylene glycol be copolymerized as the acid component and glycol component, respectively, in an amount of not greater than 15 mol %.

Examples of the 1,2-benzisothiazol-3(2H)-one 1,1-dioxide compound used in the present invention include 1,2-benzisothiazol-3(2H)-one 1,1-dioxide, salts of 1,2-benzisothiazol-3(2H)-one 1,1-dioxide, halides of 1,2-benzisothiazol-3(2H)-one 1,1-dioxide and derivatives of 1,2-benzisothiazol-3(2H)-one 1,1-dioxide, and specific examples thereof include 1,2-benzisothiazol-3(2H)-one 1,1-dioxide, sodium 1,2-benzisothiazol-3(2H)-one 1,1-dioxide, potassium 1,2-benzisothiazol-3(2H)-one 1,1-dioxide, calcium bis (1,2-benzisothiazol-3(2H)-one 1,1-dioxide), thio-1,2-benzisothiazol-3(2H)-one 1,1-dioxide, N-methyl-1,2-benzisothiazol-3(2H)-one 1,1-dioxide, 1,2-benzisothiazol-3(2H)-one 1,1-dioxide-methylether, N-propoxymethoxy-1,2-benzisothiazol-3(2H)-one 1,1-dioxide, N-propyl-1,2-benzisothiazol-3 (2H)-one 1,1-dioxide, N-(hydroxymethyl)-1,2-benzisothiazol-3(2H)-one 1,1-dioxide, N-(2-nitrophenylthio)-1,2-benzisothiazol-3(2H)-one 1,1-dioxide, N-bromo-1,2-benzisothiazol-3(2H)-one 1,1-dioxide, N-iodo-1,2-benzisothiazol-3(2H)-one 1,1-dioxide, N-chloro-1,2-benzisothiazol-3(2H)-one 1,1-dioxide, acetyl-1,2-benzisothiazol-3(2H)-one 1,1-dioxide, butyryl-1,2-benzisothiazol-3(2H)-one 1,1-dioxide, hexanoyl-1,2-benzisothiazol-3(2H)-one 1,1-dioxide, octanoyl-1,2-benzisothiazol-3(2H)-one 1,1-dioxide, decanoyl-1,2-benzisothiazol-3(2H)-one 1,1-dioxide, lauroyl-1,2-benzisothiazol-3(2H)-one 1,1-dioxide, myristoyl-1,2-benzisothiazol-3(2H)-one 1,1-dioxide, palmitoyl-1,2-benzisothiazol-3(2H)-one 1,1-dioxide, stearoyl-1,2-benzisothiazol-3(2H)-one 1,1-dioxide, cinnamoyl-1,2-benzisothiazol-3(2H)-one 1,1-dioxide, 3,4-dimethoxycinnamoyl-1,2-benzisothiazol-3 (2H)-one 1,1-dioxide, 3,4,5-trimethoxycinnamoyl-1,2-benzisothiazol-3 (2H)-one 1,1-dioxide and N-vinyl-1,2-benzisothiazol-3(2H)-one 1,1-dioxide.

Further, it is preferred that the 1,2-benzisothiazol-3(2H)-one 1,1-dioxide compound used in the present invention be a compound represented by the following Formula (1):

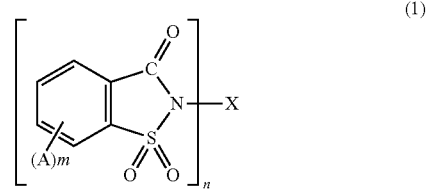

(1)

(wherein, A represents a halogen atom, $C_1$-$C_8$ alkyl group which is optionally substituted, $C_1$-$C_8$ alkoxy group which is optionally substituted, $C_1$-$C_5$ alkylthio group, nitro group or cyano group; when there are plural As, they are each optionally different; m represents an integer of 0 to 4; X represents a metal atom; and n represents an integer of 1 to 4 which corresponds to the valency of the metal atom represented by X), and the 1,2-benzisothiazol-3(2H)-one 1,1-dioxide compound may comprise a hydrate. In the plastic bottle according to the present invention, the 1,2-benzisothiazol-3(2H)-one 1,1-dioxide compound is used in an amount of 0.005 to 0.025 parts by mass with respect to 100 parts by mass of the polyester resin.

Examples of the halogen atom represented by A in the above-described Formula (1) include fluorine, chlorine, bromine and iodine.

Examples of the $C_1$-$C_8$ alkyl group which is optionally substituted, which is represented by A in the above-described Formula (1), include methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, N-octyl, isooctyl, tert-octyl, 2-ethylhexyl and trifluoromethyl, and the hydrogen atoms in these groups are optionally substituted by a halogen atom.

Examples of the $C_1$-$C_8$ alkoxy group which is optionally substituted, which is represented by A in the above-described Formula (1), include methoxy, ethoxy, propoxy, isopropoxy, butoxy, sec-butoxy, tert-butoxy and trifluoromethyloxy, and the hydrogen atoms in these groups are optionally substituted by a halogen atom.

In addition to the above-described alkyl groups and alkoxy groups, examples of the A in the above-described Formula (1) include alkylthio groups such as methylthio, ethylthio, propylthio, isopropylthio and tert-butylthio, nitro groups and cyano groups.

Examples of the metal atom represented by X in the above-described Formula (1) include lithium, potassium, sodium, magnesium, calcium, strontium, barium, titanium, manganese, iron, zinc, silicon, zirconium and yttrium. Thereamong, potassium, lithium and sodium are preferred since these have excellent effect to promote crystallization of the polyester resin, and sodium is particularly preferred.

Preferred examples of the compound represented by the above-described Formula (1) include the following Compounds No. 1 to No. 5; however, the present invention is not restricted thereto.

Compound No. 1: sodium 1,2-benzisothiazol-3(2H)-one 1,1-dioxide

Compound No. 2: lithium 1,2-benzisothiazol-3(2H)-one 1,1-dioxide

Compound No. 3: potassium 1,2-benzisothiazol-3(2H)-one 1,1-dioxide

Compound No. 4: calcium bis(1,2-benzisothiazol-3(2H)-one 1,1-dioxide)

Compound No. 5: barium bis(1,2-benzisothiazol-3(2H)-one 1,1-dioxide)

In the plastic bottle produced by the production method according to the present invention, the above-described 1,2-benzisothiazol-3(2H)-one 1,1-dioxide compound is blended in an amount of 0.005 to 0.025 parts by mass with respect to 100 parts by mass of the polyester resin. When the amount is less than 0.005 parts by mass, the effect of the addition is insufficient, and when the amount is greater than 0.025 parts by mass, the plastic bottle may become excessively crystallized and turbid, impairing the transparency.

Further, as required, other commonly-used additive(s) may also be added to the polyester resin composition in such an amount that does not practically alter the characteristics of the main component, polyester resin.

Examples of the above-described other additives include antioxidants such as phenolic, phosphorus-based and sulfur-based antioxidants; light stabilizers such as HALSs and UV absorbers; lubricants such as hydrocarbon-based lubricants, fatty acid-based lubricants, aliphatic alcohol-based lubricants, aliphatic ester-based lubricants, aliphatic amide compounds, aliphatic carboxylic acid metal salts and other metallic soap-based lubricants; heavy metal inactivators; anti-clouding agents; antistatic agents such as cationic surfactants, anionic surfactants, nonionic surfactants and ampholytic surfactants; halogen compounds; phosphate compounds; amide phosphate compounds; melamine compounds; fluorocarbon resins or metal oxides; flame retardants such as (poly) melamine phosphate and (poly)piperazine phosphate; fillers such as glass fibers and calcium carbonate; anti-blocking agents; slip agents; pigments; silicate-based inorganic additives such as hydrotalcite, fumed silica, fine-particle silica, silica rock, diatomites, clay, kaolin, diatomaceous earth, silica gel, calcium silicate, sericite, kaolinite, flint, feldspar powder, vermiculite, attapulgite, talc, mica, minnesotite, pyrophyllite and silica; crystalline nucleating agents such as dibenzylidene sorbitol, bis(p-methylbenzylidene)sorbitol, bis(p-ethylbenzylidene)sorbitol and disodium bicyclo[2.2.1] heptane-2,3-dicarboxylate.

Examples of the above-described phenolic antioxidants include 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl•3,5-di-tert-butyl-4-hydroxybenzyl thioacetate, thiodiethylenebis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butylic acid]glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis [methylene-3-(3',5'-di-tert-butyl-4'-hydroxyphenyl) propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy-1,1-dimethylethyl]-2,4,8,10-tetraoxaspiro[5.5]undecane and triethylene glycolbis[β-(3-tert-butyl-4-hydroxy-5-methylphenyl)propionate].

Examples of the above-described phosphorous-based antioxidants include triphenyl phosphite, tris(2,4-di-tert-butylphenyl)phosphite, tris(2,5-di-tert-butylphenyl)phosphite, tris(nonylphenyl)phosphite, tris(dinonylphenyl)phosphite, tris(mono-, di-mixed nonylphenyl)phosphite, diphenyl acid phosphite, 2,2'-methylenebis(4,6-di-tert-butylphenyl)octyl phosphite, diphenyldecyl phosphite, diphenyloctyl phosphite, di(nonylphenyl)pentaerythritol diphosphite, phenyl-diisodecyl phosphite, tributyl phosphite, tris(2-ethylhexyl) phosphite, tridecyl phosphite, trilauryl phosphite, dibutyl acid phosphite, dilauryl acid phosphite, trilauryl trithiophosphite, bis(neopentyl glycol)•1,4-cyclohexane dimethyl diphosphite, bis(2,4-di-tert-butylphenyl)pentaerythritol diphosphite, bis(2,5-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearyl pentaerythritol diphosphite, tetra (C12-15 mixed alkyl)-4,4'-isopropylidene diphenylphosphite, bis[2,2'-methylenebis(4,6-diamylphenyl)]•isopropylidene diphenylphosphite, tetratridecyl•4,4'-butylidenebis(2-tert-butyl-5-methylphenol)diphosphite, hexa(tridecyl)•1,1,3-tris(2-methyl-5-tert-butyl-4-hydroxyphenyl)butane•triphosphite, tetrakis(2,4-di-tert-butylphenyl)biphenylene diphosphonite, tris(2-[(2,4,7,9-tetrakis-tert-butyldibenzo[d,f][1,3,2]dioxaphosphepine-6-yl)oxy]ethyl) amine, 9,10-dihydro-9-oxa-10-phosphaphenanthrene-10-oxide and 2-butyl-2-ethylpropanediol•2,4,6-tri-tert-butylphenol monophosphite.

Examples of the above-described sulfur-based antioxidants include dialkyl thiodipropionates such as dilauryl, dimyristyl, myristylstearyl and distearyl thiodipropionates;

and β-alkylmercapto propionic acid esters of polyols such as pentaerythritol tetra(β-dodecylmercaptopropionate).

Examples of the above-described HALSs include 1,2,2,6,6-pentamethyl-4-piperidyl stearate, bis(1,2,2,6,6-pentamethyl-4-piperidyl)sebacate, bis(1-octoxy-2,2,6,6-tetramethyl-4-piperidyl)sebacate, 1,2,2,6,6-pentamethyl-4-piperidyl methacrylate, 2,2,6,6-tetramethyl-piperidyl methacrylate, tetrakis(1,2,2,6,6-pentamethyl-4-piperidyl)-1,2,3,4-butane tetracarboxylate, bis(1,2,2,6,6-pentamethyl-4-piperidyl)•bis(tridecyl)-1,2,3,4-butane tetracarboxylate, bis (1,2,2,6,6-pentamethyl-4-piperidyl)-2-butyl-2-(3,5-di-tert-butyl-4-hydroxybenzyl)malonate, 3,9-bis[1,1-dimethyl-2-{tris(1,2,2,6,6-pentamethyl-4-piperidyloxycarbonyloxy) butylcarbonyloxy}ethyl]-2,4,8,10-tetratetraoxaspiro[5.5] undecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(1,2,2,6,6-pentamethyl-4-piperidyl)amino)-s-triazine-6-ylamino] undecane, 1-(2-hydroxyethyl)-1,2,2,6,6-pentamethyl-4-piperidinol/diethyl succinate polycondensate, 1,6-bis(1,2,2,6,6-pentamethyl-4-piperidylamino)hexane/dibromoethane polycondensate, bis{4-(1-octyloxy-2,2,6,6-tetramethyl) piperidyl}decanedionate, bis{4-(2,2,6,6-tetramethyl-1-undecyloxy)piperidyl}carbonate and TINUVIN NOR 371 manufactured by Ciba Specialty Chemicals Corporation.

Examples of the above-described UV absorbers include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2-hydroxyphenyl) benzotriazoles such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolylphenol), polyethylene glycol esters of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl] benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12 to 13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy) benzoate, tetradecyl(3,5-di-tert-butyl-4-hydroxy)benzoate, hexadecyl(3,5-di-tert-butyl-4-hydroxy)benzoate, octadecyl (3,5-di-tert-butyl-4-hydroxy)benzoate and behenyl(3,5-di-tert-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenyl acrylate and methyl-2-cyano-3-methyl-3-(p-methoxyphenyl)acrylate; and a variety of metal salts and metal chelates, particularly salts and chelates of nickel and chromium.

Examples of the aliphatic amide-based compounds used as the above-described lubricant include mono-fatty acid amides such as lauric acid amide, stearic acid amide, oleic acid amide, erucic acid amide, ricinoleic acid amide and 12-hydroxy stearic acid amide; N,N'-bis-fatty acid amides such as N,N'-ethylenebis lauric acid amide, N,N'-methylenebis stearic acid amide, N,N'-ethylenebis stearic acid amide, N,N'-ethylenebis oleic acid amide, N,N'-ethylenebis behenic acid amide, N,N'-ethylenebis-12-hydroxy stearic acid amide, N,N'-butylenebis stearic acid amide, N,N'-hexamethylenebis stearic acid amide, N,N'-hexamethylenebis oleic acid amide and N,N'-xylylenebis stearic acid amide; alkylol amides such as stearic acid monomethylol amide, coconut oil fatty acid monoethanol amide and stearic acid diethanol amide; N-substituted fatty acid amides such as N-oleyl stearic acid amide, N-oleyl oleic acid amide, N-stearyl stearic acid amide, N-stearyl oleic acid amide, N-oleyl palmitic acid amide and N-stearyl erucic acid amide; and N,N'-substituted dicarboxylic acid amides such as N,N'-dioleyl adipic acid amide, N,N'-distearyl adipic acid amide, N,N'-dioleyl sebacic acid amide, N,N'-distearyl sebacic acid amide, N,N'-distearyl terephthalic acid amide and N,N'-distearyl isophthalic acid amide. These may be used individually or two or more thereof may be used as a mixture.

Examples of the above-described flame retardants include phosphoric acid esters such as triphenyl phosphate, phenol•resorcinol•phosphorus oxychloride condensates, phenol•bisphenol A phosphorus oxychloride condensates and 2,6-xylenol•resorcinol•phoshprus oxychloride condensates; phosphoric acid amides such as aniline•phosphorus oxychloride condensates and phenol•xylylenediamine•phosphorus oxychloride condensates; phosphazene; halogen-based flame retardants such as decabromodiphenyl ether and tetrabromo bisphenol A; phosphates of nitrogen-containing organic compounds such as melamine phosphate, piperazine phosphate, melamine pyrophosphate, piperazine pyrophosphate, melamine polyphosphate and piperazine polyphosphate; red phosphorus and surface-treated and microencapsulated red phosphorus; flame-retardant aids such as antimony oxide and zinc borate; and anti-drip agents such as polytetrafluoroethylene and silicone resins. The flame retardant(s) is/are added in an amount of preferably 1 to 30 parts by mass, more preferably 5 to 20 parts by mass, with respect to 100 parts by mass of the above-described polyester.

In the present invention, the plastic bottle can be molded by a variety of blow molding methods. The blow molding method is not particularly restricted; however, examples thereof include direct blow method in which a preform is extrusion molded and then subjected to blow molding, and injection blow molding method in which a preform (closed-end parison) is injection molded and then subjected to blow molding.

As the latter injection blow molding method, either of a hot parison method (one-stage method) where a preform is molded and then continuously subjected to blow molding and a cold parison method (two-stage method) where a preform is once cooled and taken out before being subjected to re-heating and blow molding can be adopted; however, in the present invention, it is particularly preferred to employ a cold parison method.

The preform obtained by injection molding or extrusion molding can be heated to 65 to 130° C., preferably 70 to 110° C., and then blow molded to obtain a blow-molded bottle. When the preheating temperature of the preform is lower than 65° C., the preform cannot be sufficiently softened and, therefore, cannot be blown, while when the preheating temperature is higher than 130° C. or the preheating time is too long, the preform may be excessively crystallized, resulting in a reduced moldability and transparency.

The mechanical strength and heat resistance of the mouth part of the plastic bottle can be improved by crystallization thereof. When the crystallization of the mouth part is insufficient, there may arise a problem of, for example, deformation of the mouth part when capping the plastic bottle, leakage of the content liquid filling the plastic bottle upon cooling of the plastic bottle, or loosening of the cap.

As a method of crystallizing the mouth part, it can be crystallized by heating the mouth part of the preform or plastic bottle before or after blow molding. The temperature of this heat crystallization is preferably in the range of 160 to 200° C., more preferably 160 to 180° C.

Further, in cases where a plastic bottle is produced for heat-resistant applications, it is required that the density of the plastic bottle be set at an appropriate level. When the density is too high, the crystallization degree of the plastic bottle becomes excessively high, which may pose a problem in blow molding, while when the density is too low, deformation of the plastic bottle may occur during heating thereof, leading to leakage of the content. The density is selected as appropriate in accordance with the polyester resin.

Specific use examples of the plastic bottle produced in accordance with the production method of the present invention include beverage container bottles for dairy products, soft drinks, alcoholic beverages and the like, storage containers of seasonings such as soy sauces and cooking oils, containers of washing agents such as shampoos and rinses, and cosmetic containers.

The present invention will now be described more concretely by way of production examples and examples; however, the present invention is not restricted thereto. It is noted here that the Production Examples are production examples of resin compositions and the Examples are production examples of plastic bottles comprising the obtained resin compositions. The plastic bottle production is composed of a preform molding step, mouth crystallization step and bottle molding step, and evaluations were carried out after each production step. Example 1 used Resin Composition 1 obtained in Production Example 1, and in Comparative Examples 1 to 4, Comparative Resin Compositions 1 to 4 obtained in Comparative Production Examples 1 to 4 were used, respectively. The results thereof are shown in Table 1 below.

PRODUCTION EXAMPLE 1

To 100 parts by mass of a polyethylene terephthalate resin (CB-651 manufactured by Far Eastern Textile Ltd.), 0.300 parts by mass of the Compound No. 1 was added and mixed well. The resulting mixture was granulated by a biaxial extruder (machine: TEX28 manufactured by The Japan Steel Works, Ltd.; cylinder temperature: 270° C.; screw speed: 200 rpm) to prepare a masterbatch having a concentration of 0.3%. Then, 7.16 parts by mass of the masterbatch was mixed with 100 parts by mass of a polyester resin to obtain Resin Composition 1 which contains 0.020 parts by mass of the Compound No. 1 with respect to 100 parts by mass of the polyester resin.

COMPARATIVE PRODUCTION EXAMPLE 1

Comparative Resin Composition 1, which does not contain a crystalline nucleating agent, was obtained without blending any crystalline nucleating agent to the polyethylene terephthalate resin (CB-651 manufactured by Far Eastern Textile Ltd.)

COMPARATIVE PRODUCTION EXAMPLE 2

Comparative Resin Composition 2, which contains a crystalline nucleating agent (Compound No. 1) at a concentration of 0.027%, was prepared in the same manner as in the Production Example 1, except that 10 parts by mass of the above-described masterbatch was mixed with 100 parts by mass of the polyester resin.

COMPARATIVE PRODUCTION EXAMPLE 3

To 100 parts by mass of the polyethylene terephthalate resin (CB-651 manufactured by Far Eastern Textile Ltd.), 0.020 parts by mass of powder-form Compound No. 1 was added and mixed to obtain Comparative Resin Composition 3.

COMPARATIVE PRODUCTION EXAMPLE 4

Comparative Resin Composition 4 was produced in the same manner as in the above-described Production Example 1, except that the Compound No. 1 was changed to sodium 4-methylbenzene sulfonamide.

[Preform Molding Step]

After drying each of the resin compositions obtained in the above-described Production Example 1 and Comparative Production Examples 1 to 4 in a Geer oven at 160° C. for 4 hours, the thus dried resin compositions were each molded into a preform (mouth outer diameter: 25 mm, weight: 23 g) using an injection molding machine (ASB-50HT; manufactured by Nissei ASB Machine Co., Ltd.) at an injection molding temperature of 280° C. For the thus obtained preforms, the following evaluations were carried out.

(1) Moldability: The symbol "○" was assigned when the dimensions such as thread diameter and neck height were consistent at the mouth part of the plastic bottle, and the symbol "x" was assigned when the dimensions were not consistent.

(2) Outer appearance: The symbol "○" was assigned when the outer appearance of the preform was transparent, the symbol "x" was assigned when it was turbid, and the symbol "Δ" was assigned when it was hazy.

[Mouth-Part Crystallization Step]

The preforms molded in the above were subjected to mouth-part crystallization by a mouth crystallization machine (machine: CM-2000 manufactured by Nissei ASB Machine Co., Ltd.). In the mouth-part crystallization, the mouth part of the preforms was heated at 160 to 180° C. for about 90 seconds to promote crystallization. It is noted here that, since the preform of the Comparative Resin Composition 3 obtained in the Comparative Production Example 3 was confirmed to be turbid and stretching thereof by a blow molding machine was thus not possible, the mouth-part crystallization was not performed on the preform of the Comparative Resin Composition 3. For the mouth-part crystallization of the preforms, the following evaluations were carried out.
(1) Molding cycle: The number of mouth-part crystallizations of the preform per hour was counted.
(2) Density: A non-crystallized part of the perform mouth was cut out and the density thereof was measured by an electronic densitometer (EW-120SG; manufactured by Mirage Trading Co., Ltd.).

[Bottle Molding Step]

From the preform which was obtained by molding the above-described Resin Composition 1 or Comparative Resin Composition 1 and subjected to mouth-part crystallization, a 500-ml plastic bottle was prepared by biaxially-stretching blow-molding using a blow molding machine (ASB-50HT manufactured by Nissei ASB Machine Co., Ltd.). For the thus obtained plastic bottle, the following evaluations were carried out.
(1) Crystallization temperature: After cutting the plastic bottle obtained by the above-described method into small pieces and drying them under reduced pressure at 150° C. for 5 hours, 5 mg thereof was weighed and loaded onto an aluminum pan to measure the crystallization temperature using a differential scanning calorimeter (machine: Diamond manufactured by PerkinElmer Co., Ltd.). In this measurement, the thus loaded plastic bottle was heated to 300° C. at a rate of 10° C./min, maintained at this temperature for 1 minute, and then cooled to 50° C. at a rate of 10° C./min. The exothermic peak temperature in this process was determined as the crystallization temperature.
(2) Yellowness (YI: Yellowness Index): The 5 plastic bottles obtained by the above-described method were left to stand in a 50° C. oven for 5 hours. Thereafter, the yellowness of the 5 plastic bottles were measured and an average value was determined.
(3) Density: The side portion of the plastic bottle body (not the part subjected to the mouth-part crystallization) was cut out and the density thereof was measured by an electronic densitometer (EW-120SG; manufactured by Mirage Trading Co., Ltd.).
(4) Outer appearance: The symbol "○" was assigned when the outer appearance of the plastic bottle was transparent, the symbol "x" was assigned when it was turbid, and the symbol "Δ" was assigned when it was hazy.

According to the Comparative Example 1, in the plastic bottle which was produced without blending any crystalline nucleating agent, the transparency and yellowness were hardly affected; however, the molding cycle was extremely slow as compared to Example 1. According to the Comparative Example 2, when the crystalline nucleating agent was blended in the plastic bottle in an amount of 0.027 parts by mass, which is in excess of 0.025 parts by mass, with respect to 100 parts by mass of the polyester resin, the outer appearance of the preform was hazy in white and became turbid when the preform was blow molded, yielding a plastic bottle having impaired transparency. According to the Comparative Example 3, when the crystalline nucleating agent was blended to the polyester resin directly in powder form, not in a masterbatch, the preform became colored in yellowish brown when molded, and a portion of the molded preform was whitened by a further crystallization, so that blow molding thereof was not possible. According to the Comparative Example 4, when the crystalline nucleating agent was changed to sodium 4-methylbenzene sulfonamide, which is not a 1,2-benzisothiazol-3(2H)-one 1,1-dioxide compound, although the molding cycle was improved, yellow discoloration was confirmed in the molded articles of the preform and plastic bottle and a colorless and transparent plastic bottle could not be produced.

In contrast to the above, in the Example 1, it was confirmed that the plastic bottle produced in accordance with the production method of the present invention has a good outer appearance and shortened molding cycle. In addition, based on the finding that the Example 1 and Comparative Example 1 did not have a difference in their densities after the blow molding, in the plastic bottle produced in accordance with the production method of the present invention, it was confirmed that the crystallization of the polyester resin in the blow molding has hardly any effect and the discoloration of the molded product is suppressed, and that the preform molding cycle is largely improved.

The invention claimed is:
1. A method of producing a plastic bottle comprising 0.005 to 0.025 parts by mass of a 1,2-benzisothiazol-3(2H)-one 1,1-dioxide compound with respect to 100 parts by mass of a polyester resin, said method comprising:

TABLE 1

| | | Example 1 | Comparative Example 1 | Comparative Example 2 | Comparative Example 3 | Comparative Example 4 |
|---|---|---|---|---|---|---|
| Crystalline nucleating agent/Added amount (% by mass) | | Compound No. 1 0.020 | Control [1] 0.000 | Compound No. 1 0.027 | Compound No. 1 0.020 | Comparative Compound [2] 0.020 |
| Method of adding nucleating agent to polyester resin | | In masterbatch | In masterbatch | In masterbatch | In powder form | In masterbatch |
| Preform molding step | Moldability | ○ | — | ○ | X | ○ |
| | Outer appearance (Transparency) | ○ | ○ | Δ | X | ○ |
| Mouth-part crystallization step | Molding Cycle (number/hour) | 1800 | 800 | 1800 | — | 1800 |
| | Density (g/cm³) | 1.375 | 1.375 | 1.375 | — | 1.375 |
| Bottle molding step | Crystallization temperature (° C.) | 184.5 | 171.5 | 185.3 | — | 184.2 |
| | Yellowness (YI) | 1.9 | 2.1 | 2.0 | — | 3.1 |
| | Density (g/cm³) | 1.368 | 1.367 | — | — | — |
| | Outer appearance (Transparency) | ○ | ○ | X | — | ○ |

[1] Control: No crystalline nucleating agent was blended
[2] Comparative Compound 1: Sodium 4-methylbenzene sulfonamide a first step of preparing a masterbatch containing 0.01 to 0.5 parts by mass of said 1,2-benzisothiazol-3(2H)-one 1,1-dioxide compound with respect to 100 parts by mass of said polyester resin, subsequently a second step of mixing said masterbatch and additional polyester resin to prepare a mixture, and a third step of molding said mixture into the shape of a bottle by blow molding.

2. The method of producing a plastic bottle according to claim 1, wherein said polyester resin is a polyethylene terephthalate resin.

3. The method of producing a plastic bottle according to claim 1, wherein said 1,2-benzisothiazol-3(2H)-one 1,1-dioxide compound is represented by the following Formula (1):

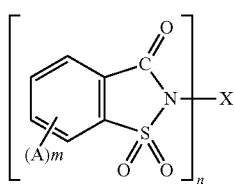

(1)

wherein, A represents a halogen atom, $C_1$-$C_8$ alkyl group which is optionally substituted, $C_1$-$C_8$ alkoxy group which is optionally substituted, $C_1$-$C_5$ alkylthio group, nitro group or cyano group; when there are plural As, they are each optionally different; m represents an integer of 0 to 4; X represents a metal atom; and n represents an integer of 1 to 4 which corresponds to the valency of said metal atom represented by X.

4. The method of producing a plastic bottle according to claim 3, wherein said X is sodium and said n is 1 in said Formula (1).

5. The method of producing a plastic bottle according to claim 1, wherein said mixture of said masterbatch and polyester resin is injection molded to prepare a cylindrical preform which is then molded into the shape of a bottle by blow molding.

6. The method of producing a plastic bottle according to claim 5, wherein said preform is molded into the shape of a bottle by blow molding after the mouth part thereof is heated to be crystallized.

7. The method of producing a plastic bottle according to claim 1, wherein produced plastic bottle is a heat-resistant plastic bottle.

8. The method of claim 1, wherein preparing a masterbatch comprises mixing the 1,2-benzisothiazol-3(2H)-one 1,1-dioxide compound with the polyester resin at the time of a polycondensation reaction of the polyester resin.

9. The method of claim 8, wherein the blending at the time of the polycondensation reaction of the polyester resin comprises a slurry method.

10. The method of claim 1, wherein the 1,2-benzisothiazol-3(2H)-one 1,1-dioxide compound is dissolved in a solvent and added at the time of the polycondensation reaction of the polyester resin.

* * * * *